United States Patent
Busevs et al.

(10) Patent No.: US 11,989,773 B2
(45) Date of Patent: May 21, 2024

(54) SYSTEMS AND METHODS FOR LOAN REWARDS PROVISIONING

(71) Applicant: ROYAL BANK OF CANADA, Montreal (CA)

(72) Inventors: Dimitri Busevs, Toronto (CA); Michael Paul Dobbins, Toronto (CA)

(73) Assignee: Royal Bank Of Canada, Toronto (CA)

( * ) Notice: Subject to any disclaimer, the term of this patent is extended or adjusted under 35 U.S.C. 154(b) by 334 days.

(21) Appl. No.: 15/833,610

(22) Filed: Dec. 6, 2017

(65) Prior Publication Data

US 2018/0158138 A1 Jun. 7, 2018

Related U.S. Application Data

(60) Provisional application No. 62/430,487, filed on Dec. 6, 2016.

(51) Int. Cl.
| | |
|---|---|
| G06Q 40/03 | (2023.01) |
| G06Q 20/20 | (2012.01) |
| G06Q 20/40 | (2012.01) |
| G06Q 30/0226 | (2023.01) |
| H04L 9/08 | (2006.01) |
| H04L 9/14 | (2006.01) |
| H04L 9/30 | (2006.01) |
| H04L 9/32 | (2006.01) |

(52) U.S. Cl.
CPC ............. *G06Q 40/03* (2023.01); *G06Q 20/20* (2013.01); *H04L 9/0861* (2013.01); *H04L 9/14* (2013.01); *H04L 9/30* (2013.01); *H04L 9/3226* (2013.01); *G06Q 20/4014* (2013.01); *G06Q 30/0226* (2013.01); *G06Q 2220/00* (2013.01); *H04L 2209/56* (2013.01)

(58) Field of Classification Search
CPC ..................................................... G06Q 20/206
USPC .......................................................... 705/38
See application file for complete search history.

(56) References Cited

PUBLICATIONS

Wikipedia, Trusted execution environment, Captured on Oct. 12, 2016 by Wayback Machine. (Year: 2016).*
Wikipedia, Near Field Communication, Captured on Apr. 3, 2015 by Wayback Machine. (Year: 2015).*

* cited by examiner

*Primary Examiner* — Cho Kwong
(74) *Attorney, Agent, or Firm* — Norton Rose Fulbright Canada LLP

(57) ABSTRACT

A computer system for provisioning automobile financing is described, including: at least one data interface adapted to receive partial or masked pre-approval data set from a backend computing device associated with a financial institution, the partial or masked pre-approval data set configured such that pre-approval data set associated with a potential loan transaction is not independently accessible by the computer system; the at least one data interface adapted to receive, from a customer or a customer device, a corresponding identifier or portion of pre-approval data set that complements the partial or masked pre-approval data set; an integration engine adapted for combining the partial or masked pre-approval data set and the corresponding identifier or portion of pre-approval data set to regenerate the complete pre-approval data set associated with the potential loan transaction; a loan provisioning engine adapted for provisioning the loan transaction in accordance with the complete pre-approval data set.

9 Claims, 6 Drawing Sheets

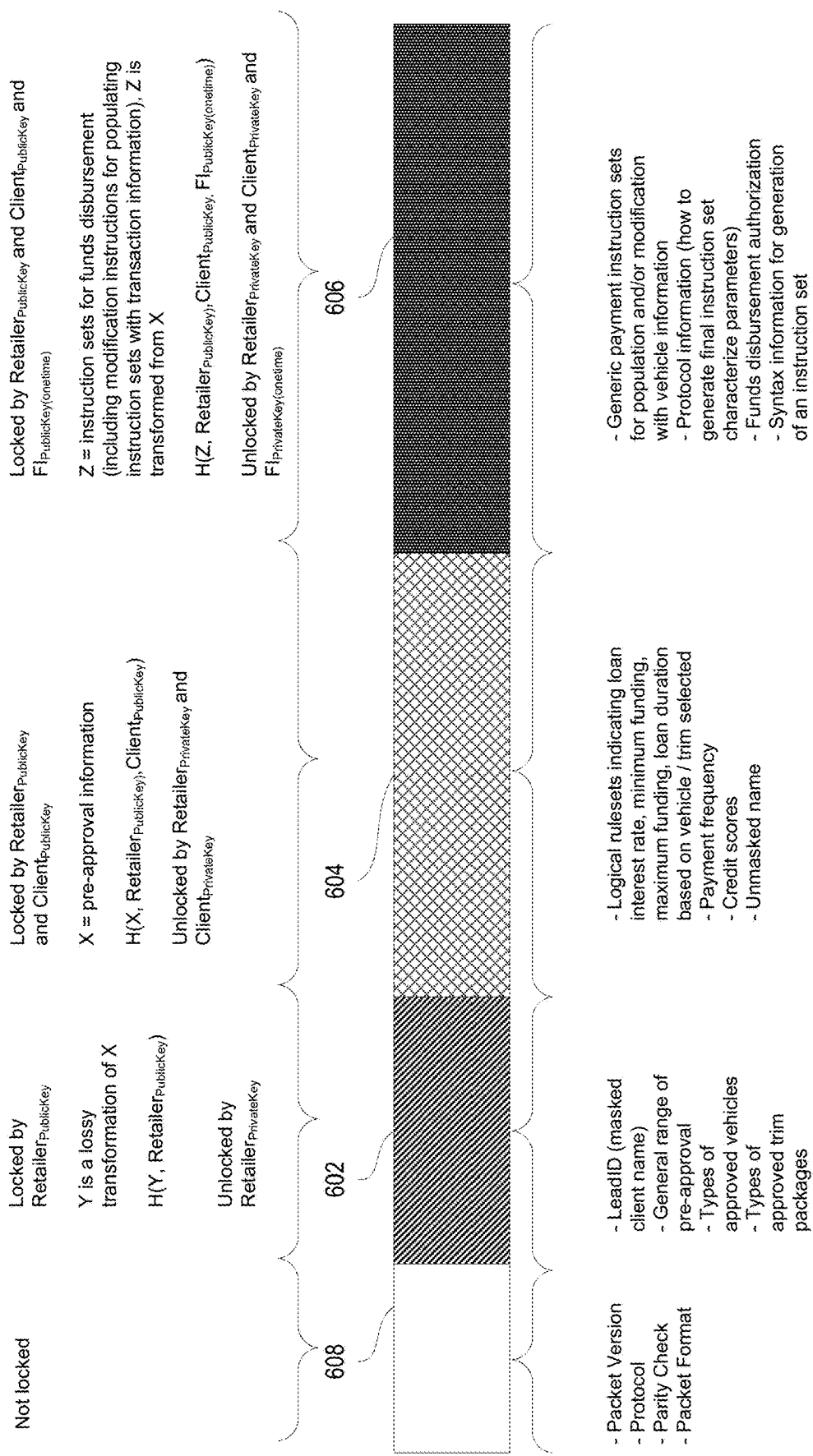

SYSTEMS AND METHODS FOR LOAN REWARDS PROVISIONING

CROSS-REFERENCE TO RELATED APPLICATIONS

The present disclosure claims all benefit including priority to U.S. Provisional Patent Application No. 62/430,487, filed Dec. 6, 2016, and entitled "SYSTEMS AND METHODS FOR LOAN REWARDS PROVISIONING", the entirety of which is hereby incorporated by reference.

FIELD

The present disclosure generally relate to the field of data processing, and more specifically, loan rewards provisioning.

INTRODUCTION

In the context of automobile financing, such transactions involve a number of different stakeholders, each of which may be associated with a corresponding computing system and/or devices.

Security and privacy of transactions is a challenge. A customer for financing may not wish to reveal his/her identity until a transaction is finalized or near finalization. However, to establish that the customer is eligible for financing, a financial institution may wish to share information to a dealer or other seller prior to the transaction. In some scenarios, such financing information is a key consideration in determining characteristics of the transaction, such as whether the transaction can be finalized at a particular time, determining the seriousness and credit risk of a transaction (especially if the marketplace is an online marketplace), among others.

SUMMARY

A technical solution is described in some embodiments that aids in the sharing of information through the use of specially configured data structures that are adapted for cryptographic transformations. The technical solution applies technical security mechanisms to improve a level of trust by cryptographically locking information that is released upon the provisioning of cryptographic keys at various stages of a transaction. A specific data encapsulation device can be utilized for generating the data structure (containing data payloads, enhanced with cascaded levels of encryption). The secure data encapsulation processor may be configured to operate independently of other computer processors on computing systems, includes, in some embodiments a dedicated secure crypto-processor that is a secure enclave operating on a computer motherboard.

The data structures are enhanced using multi-layer cryptographic mechanisms configured to avoid releasing information at too early a stage or to unauthorized individuals. The data structures are usable in the context of loan transactions, and in particular, loan transactions for automobile financing (or vehicles such as boats, recreational aircraft), whether the transaction occurs through a dealership (e.g., manufacturer associated dealership, second hand dealership) or a private sale (as between individuals).

There is risk in these types of transactions that is difficult to overcome in a conventional purchase scenario, as financing and payment are often non-contemporaneous or even near contemporaneous. Dishonest practices may lead to increased fraud and losses for any stakeholder in the transaction, and a technical solution to trust-related problems is described in some embodiments wherein specially configured data structures and payloads are implemented. The data structures include at least an encrypted container (e.g., data payloads) encapsulating loan transaction information, and are distributed or otherwise made available to one or more vehicle sellers or points of sale, such as dealerships, electronic automobile transaction platforms, online marketplaces (e.g., eBay™ Motors), etc. In some cases, the points of sales are individuals.

The data encapsulation device generates public-private key pairs, distributes the corresponding private keys, and receives underlying pre-approval information data sets to generate obfuscated versions of the financial loan pre-approval details for encapsulation into a first portion of the enhanced data structure. The data encapsulation device encapsulates the financial loan pre-approval details into a second portion of the enhanced data structure, generates programmatic instructions that are configured to, automatically in response to parameters passed to it by in relation to a loan transaction (e.g., vehicle type, make, cost) set a loan transaction amount and an interest rate (as this information is not known at the time of the generation of the pre-approval information) for generating automated transaction processing instruction sets, which encapsulated into a third portion of the enhanced data structure.

From a technical perspective, obfuscation versions are generated by way of a mask being applied to the pre-approval details. The mask can include bit masks, applied by a masking engine that transforms the pre-approval details first into a bitwise representation (for a second portion of the data structure), and applies the mask to generate a partially masked version for the first portion of the data structure. In some embodiments, the mask is reversible, and the second portion includes information that is applied to reverse the mask. In this example, the mask is a bitwise transformation, and the second portion stores details of the inverse bitwise transformation, the inverse bitwise transformation being applied to the first portion to obtain the underlying loan information. Storing simply the inverse bitwise transformation reduces the memory required to store the data structure. Bitwise transformations include bit-shifts, various combination of bitwise operators such as AND, OR, XOR, NOT, etc. Bitwise transformations are particularly well suited for reduction of processing time required as they, in some embodiments, are performed using high speed FPGAs or shift registers (e.g., a cascade of memory flip-flops). Parallel-in memory registers can be used to conduct shifts efficiently.

The public-private key pairs are used to secure the data structure during encapsulation. The data structures store parts of pre-approval data, and in some embodiments, the data structures include a first portion that is accessible by the point of sale (e.g., by way of an encryption key related to the point of sale) without the user being present. This first portion may include basic information, such as a client code (e.g., if the user does not wish to reveal the user's identity), a range of financing available to the client (e.g., financing is available up to $80 K), among others.

There may be a second portion that is encrypted such that further information is provided to the point of sale upon the triggering by way of a detected event. The second portion, for example, may be encrypted such that a complementary client encryption key is required to be provided by the client's personal computing device. A detected event may include receipt of signals from a client's personal computing device that the user has entered the proximity of the point of sale device, the client has logged into a web portal associated with the point of sale, or an amount of time has elapsed. Other potential events may include the electronic communication of the complementary client encryption key by way of near field communication, Bluetooth™, WiFi, etc. This second portion may be accessed by the point of sale to reveal additional information, such as an interest rate, the client's identity, among others.

In some embodiments, the data structure includes a third portion which is encrypted with multiple keys, such that the information is unlockable only by a computing device having all of the keys available. The third portion is configured to store data sets that are configured for automatic provisioning and/or processing of funds disbursement from a financial account to an account associated with the point of sale device or the automobile vendor, consummating the purchase financing.

As the transaction information is only available at the time of the transaction (and not when the data structure is originally generated), the third portion includes programmatic instructions that require population with transaction information prior to transmission to one or more automated clearing house servers. The third portion may include syntactical protocol descriptors, which describe how parameters are transformed in generating instruction sets for processing by the one or more automated clearing house servers. The programmatic instructions may indicate, for example, instructions for generating security interests, setting interest rates, loan rates, amortization periods, etc.

Where the purchase financing can be consummated, in accordance with some embodiments, at or proximate to the time of finalizing of the transaction the vendor is able to obtain a full payment for the vehicle (both contributions from the financial institution providing the financing and contributions from the client directly). A potential benefit is the ability to have all participants "walk away" from the transaction being fully paid up (e.g., the vendor is fully paid from a combination of financing and payment from the client).

As the third portion of the data structure is configured to store data sets that cause the outlaying of a significant amount of funds, the third portion of the data structure includes a higher level of security than the first and second portions. In some embodiments, the third portion of the data structure is encrypted such that a first encryption key, a second encryption key, and a third encryption key are all needed to unlock the third portion such that the third portion can be decrypted (for use in facilitating the transaction).

In accordance with an aspect, there is provided a data encapsulation device for generating enhanced data structure configured for secure automobile financing, the enhanced data structure including: a first portion encapsulating a first data payload storing first data sets representative of obfuscated financial loan pre-approval details transformed from an underlying pre-approval information data set, the first data payload encrypted using at least with a public key associated with a client; a second portion encapsulating a second data payload storing second data sets representative of the underlying pre-approval information data set, the second data payload encrypted at least with a first combination of the public key associated with the client and a public key associated with a point of sale; and a third portion encapsulating a third data payload storing third data sets representative of automated transaction processing instruction sets, the third data payload encrypted at least with a second combination of the public key associated with the client, the public key associated with a point of sale, and a one-time use public key associated with a financial institution; wherein the third data sets are adapted to be transformed with transaction information in the form of electronic parameters, and transformed third data sets are adapted for electronic transmission to one or more automated clearing house servers to control a disbursement of funds from a financial institution bank account to a target recipient bank account; and the data encapsulation device including at least a processor configured to: generate public-private key pairs, including at least the public key associated with the client, the public key associated with the point of sale, and the one-time use public key associated with the financial institution, and the corresponding private keys; distribute the corresponding private keys to corresponding computing devices associated with the client, the point of sale, and the financial institution; receive the underlying pre-approval information data set and transform the underlying pre-approval information data set to generate the obfuscated financial loan pre-approval details; generate a variable set of programmatic instructions that, responsive to the transaction information, automatically set a loan transaction amount and an interest rate, the variable set of programmatic instructions being transformed into the automated transaction processing instruction sets; encapsulate the enhanced data structure in the form of an encrypted data packet using at least the public key associated with the client, the public key associated with the point of sale, and the one-time use public key associated with the financial institution; and distribute the enhanced data structure to the corresponding computing devices associated with the point of sale.

In accordance with another aspect, the processor is a dedicated secure crypto-processor configured to encapsulate the enhanced data structure in the form of the encrypted data packet independently of the corresponding computing devices associated with the client, the point of sale, and the financial institution such that none of the corresponding computing devices associated with the client, the point of sale, and the financial institution are able to access the data packet prior to encryption.

In accordance with another aspect, the dedicated secure crypto-processor is housed in a secure enclave in a computer motherboard.

In accordance with another aspect, the transaction information includes at least one of a unique vehicle identification number string, a transaction price integer; and wherein the one or more automated clearing house servers are configured to receive the transformed third data sets to automatically determine at least a loan amount and a loan interest rate, the loan amount being disbursed from the financial institution bank account to the target recipient bank account, and the loan amount being automatically registered as a loan against a client bank account in accordance with an electronically registered security interest designating a vehicle identified by the unique vehicle identification number string as collateral.

In accordance with another aspect, the third data sets include syntactical protocol descriptors, which are utilized for transforming the third data sets in accordance with the electronic parameters.

In accordance with another aspect, there is provided a computer readable medium, storing an enhanced data structure configured for secure automobile financing, the enhanced data structure including: a first portion encapsulating a first data payload storing first data sets representative of obfuscated financial loan pre-approval details transformed from an underlying pre-approval information data set, the first data payload encrypted using at least with a public key associated with a client; and a second portion encapsulating a second data payload storing second data sets representative of the underlying pre-approval information data set, the second data payload encrypted at least with a first combination of the public key associated with the client and a public key associated with a point of sale.

In accordance with another aspect, the enhanced data structure includes: a third portion encapsulating a third data payload storing third data sets representative of automated transaction processing instruction sets, the third data payload encrypted at least with a second combination of the public key associated with the client, the public key associated with a point of sale, and a one-time use public key associated with a financial institution.

In accordance with another aspect, the third data sets are adapted to be transformed with transaction information in the form of electronic parameters, and transformed third data sets are adapted for electronic transmission to one or more automated clearing house servers to control a disbursement of funds from a financial institution bank account to a target recipient bank account.

In accordance with another aspect, the third data sets include syntactical protocol descriptors, which are utilized for transforming the third data sets in accordance with the electronic parameters.

In accordance with another aspect, the transaction information includes at least one of a unique vehicle identification number string, a transaction price integer; and wherein the one or more automated clearing house servers are configured to receive the transformed third data sets to automatically determine at least a loan amount and a loan interest rate, the loan amount being disbursed from the financial institution bank account to the target recipient bank account, and the loan amount being automatically registered as a loan against a client bank account in accordance with an electronically registered security interest designating a vehicle identified by the unique vehicle identification number string as collateral.

In accordance with another aspect, there is provided a computer system for provisioning automobile financing, the computer system comprising: at least one data interface adapted to receive partial or obfuscated pre-approval data set from a backend computing device associated with a financial institution, the partial or obfuscated pre-approval data set configured such that pre-approval data set associated with a potential loan transaction is not independently accessible by the computer system; the at least one data interface adapted to receive, from a customer or a customer device, a corresponding identifier or portion of pre-approval data set that complements the partial or obfuscated pre-approval data set; an integration engine adapted for combining the partial or obfuscated pre-approval data set and the corresponding identifier or portion of pre-approval data set to regenerate the complete pre-approval data set associated with the potential loan transaction; a loan provisioning engine adapted for provisioning the loan transaction in accordance with the complete pre-approval data set; and a communication system adapted to generate configured signals to the backend computing device indicative of the provisioned loan transaction.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 6 is a data structure diagram illustrating a sample data structure, according to some embodiments.

DETAILED DESCRIPTION

Figure 1:
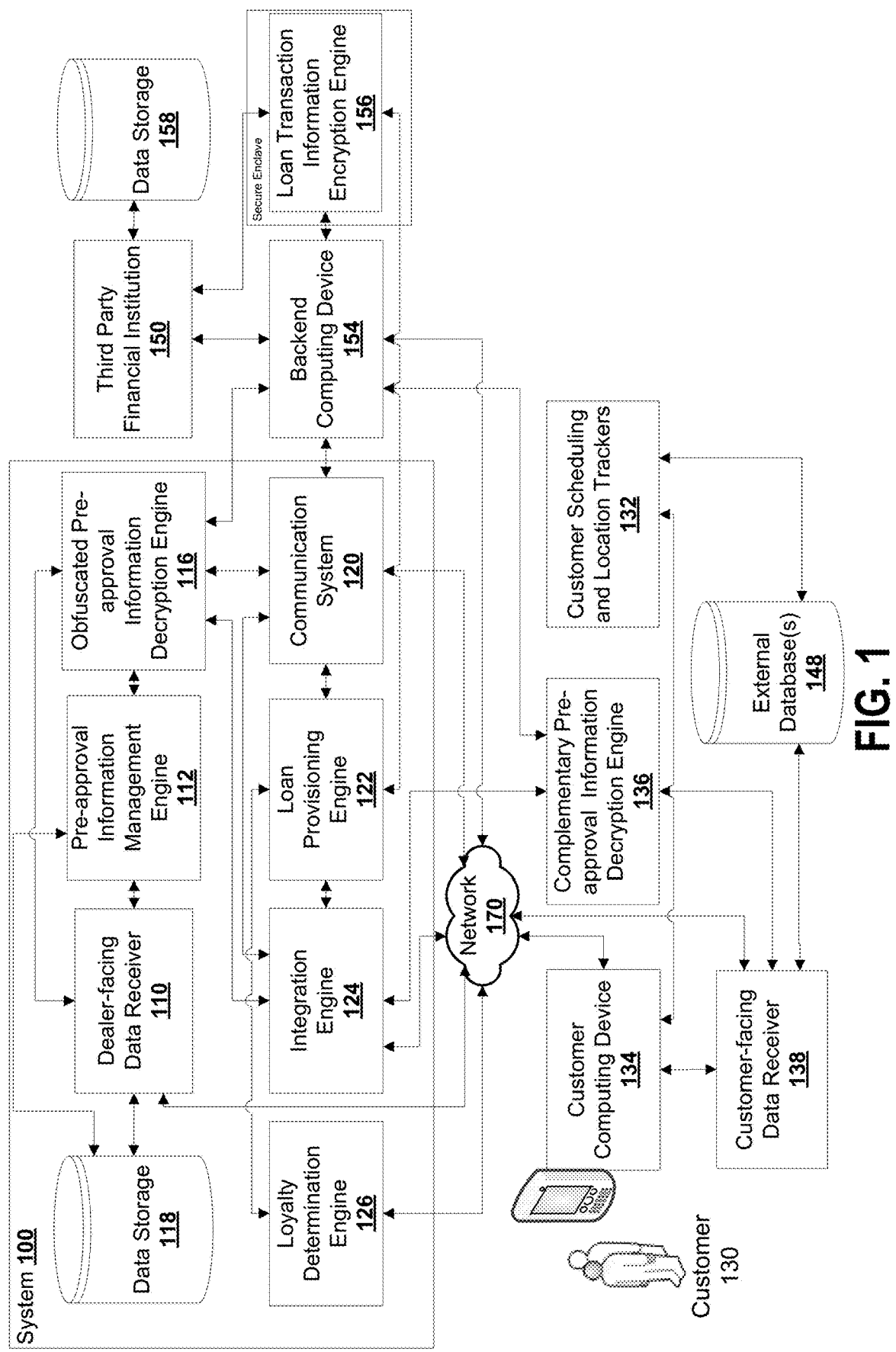
FIG. 1 illustrates a block diagram of a system for provisioning loans according to some embodiments.

A technical solution is described in some embodiments that aids in the sharing of information through the use of specially configured data structures that are adapted for cryptographic transformations. The data structure is adapted for secure storage of data sets stored in different portions, the different portions storing different information that is accessible at different times during a purchase/lease transaction, such as a purchase/lease transaction for an automobile.

The different portions facilitate the financing of the purchase/lease transaction, and are specially configured to improve security and identity validation through the use of cryptographic techniques. As the phases of a transaction occur, different amounts of information is required to be provided to a point of sale (e.g., a dealership). However, not all of this information is desirable at all stages (e.g., the client may wish to keep his/her identity a secret until physically walking into the dealership), and some of the information may further require a higher level of security as they may represent codes, passwords, instruction sets, etc. that control the processing or disbursing of a financing transaction.

Embodiments of methods, systems, and apparatus are described through reference to the drawings. The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Data processes and corresponding computer implemented systems are described in relation to provisioning automobile financing. As described in some embodiments, the data processes are configured to utilize aspects of computer technology to derive benefits related to increasing the ease in which automobile financing can be conducted, as well as to increase security, anonymity, and efficiency by utilizing a technological platform to support one or more transactions.

In the context of automobile financing, such transactions involve a number of different stakeholders, each of which may be associated with a corresponding computing system and/or devices. A customer may wish to enter a transaction involving the purchase or the lease of an automobile, and the counterparty may be another individual or a dealer. A dealer in the context of this application is not limited to automobile manufacturers, but may also include independent third party dealers, dealerships, or more broadly, any organization that transacts in the purchase or lease of automobiles.

An underlying organization, such as a financial institution, supports the transaction process by providing funds to the customer. These funds may be provisioned in accordance with one or more loan terms that may, in some embodiments, be negotiated in advance between the financial institution and the customer. In some cases, the loan terms may be established in the form of a "pre-approval", which may include one or more attributes, such as a total amount of available loan (e.g., $30,000), a loan rate, a loan term, a loan type, loan options (e.g., convertibility), collateral type (if any), constraints on type of vehicle (e.g., a four-door sedan), among others.

The customer may visit one or more dealers over the course of conducting research and determining which dealer has terms amenable to the customer's interests. While the dealer may have financing terms available from financial institutions associated with the dealer, these financing terms may be suboptimal and the customer may benefit from having established loan terms encapsulated in one or more pre-approvals with other financial institutions of the customer's choice.

For example, a customer may have pre-negotiated loan terms with three other financial organizations of the customer's choice prior to entering into negotiations with the dealer. When the customer negotiates with the dealer, the customer has increased flexibility relating to financing and depending on the customer's financial interests, the customer may desire to apply the loan terms associated with one of the one or more pre-approvals that were pre-negotiated with the corresponding financial institution.

In some embodiments, a system is disclosed that is configured for provisioning automobile financing. The system, for example, can be a physical dealer facing system that has corresponding data interfaces and computer-implemented modules and/or units that provision the financial loan. An improved data structure (e.g., an enhanced data structure) is utilized by the system that includes cryptographic elements and portions that aid in improving and/or ultimately facilitating the transaction through control instructions embedded into the improved data structure.

In some embodiments, the customer's identity and related loan information of the the financial institutions may have important privacy interests that need to be safeguarded. For example, the customer may not wish to have the customer's identity broadcast to various dealers, and similarly, financial institutions may not wish to have their terms available to dealers as dealers may utilize the information to derive competitive advantage.

Accordingly, in some embodiments, the data set associated with the pre-approval may be segmented and/or otherwise protected such that the information is not independently accessible by the dealer's computing system without a corresponding key or data set. For example, the dealer system may be configured to obtain, in the form of batch records, partial or obfuscated pre-approval data sets from one or more connected financial institutions (e.g., a bank or other lender). Encryption mechanisms for protecting the data include one-way hashes, symmetric keys, asymmetric keys (e.g., public/private key pairs), etc. These encryption mechanisms, in some embodiments, are cascaded with one another such that overcoming them may require multiple authorizations from different parties (e.g., a particularly sensitive data portion may need authorizations from a financial institution, a client, and a vendor prior to controlling or otherwise causing a disbursement of funds).

A first portion of a data structure may be made available, for example, on a fairly efficient push or bulk basis to one or more vendors, making certain information available to the vendors, such as a list of client pseudonyms or identifiers that have pre-approvals, and high-level information associated with the pre-approvals, such as credit rating range, a range of pre-approval financing (e.g., $20,000-$30,000). The first portion of the data structure may aid the vendor in demand identification, or aid the vendor in preparing vendor backend systems for handling prospective clients. The first portion of the data structure may be accessible, for example, through the use of a vendor key (e.g., encrypted using a public part of vendor key, and the vendor is able to access it using the vendor's corresponding private key).

When a client arrives, the client may be able to provide access to a second portion of the data structure by provisioning a client key, allowing the vendor to obtain more information about the client (e.g., name, address, contact information), and more detailed information about the pre-approval (actual limits, restrictions on type of automobile, available payment structure/terms, interest rates, proof of employment/income, driver's license information, insurance history, among others). This client key, in combination, for example, with the vendor key, can be used to unlock the second portion. Similar to the vendor key, in some embodiments, the client key is split into a public and a private key, and the second portion is encrypted using a combination of both the vendor and client public keys (e.g., cascade encryption), and unlocked using a combination of both the vendor and client private keys. The client private key may reside on a mobile application (e.g., an online banking application) residing on the client's device, which may then be utilized to authorize (e.g., by way of authenticating on the mobile application) the provisioning of the client's private key to the point of sale/vendor device. A key integration engine may be utilized to combine the keys to unlock the second portion.

When negotiations conclude regarding the transaction details, in some embodiments, a corresponding and/or complementary pre-approval data set (e.g., a third portion) may be provided by the customer or the customer's device (e.g., mobile device). In combination, the dealer's stored information and the customer/customer devices' information can be utilized to regenerate the loan transaction details and to provision the loan transaction in accordance with the information that was pre-negotiated as a pre-approval between the customer and the financial institution.

The third portion may include control signal data sets that are utilized to automatically facilitate the financing, allowing for disbursement of the funds from the financing entity to the vendor or vendor bank account. The control signal data sets may include wire transfer instructions, automated clearing house instructions, settlement instructions to an escrow computing service, among others. As the third portion requires a high level of security, in some embodiments, three different keys are utilized. The financial institution may utilize a high security one-time key pair for the pre-approval, the key pair including a financial institution (FI) public and private key, and the third portion is secured by a combination of the client, vendor, and FI public keys (e.g., cascade encryption), and only unlockable with the combination of the three corresponding private keys (e.g., by way of an integration engine).

The third portion is adapted for transmission to an automated mechanism (e.g., financial institution server device or other service) that validates the instructions, and processes them accordingly to release the funds. For example, the dealer system may include one or more integration engines that are adapted for regenerating pre-approval information based on both the information provided by the dealer and the information provided by the customer. A loan provisioning engine may then provision the loan transaction accordingly, and a signal may be sent to computing systems associated with the financial institution providing the loan indicating that the loan has been provisioned, and that the pre-approval has been utilized.

The on-demand provisioning of the finances enables improved ease of access and increased security, reducing the amount of paperwork required and potential issues in accuracy and information transmission. A dealer, for example, may be able to finalize a deal while out on a test drive, several hours following the client's departure from the premises, etc.

In a further embodiment, the client's mobile application is able to process, simultaneously or sequentially, the payment from the client's bank account in addition to providing the client key for unlocking the data structure, and may interoperate a coordinated transaction with the vendor backend system or point of sale device to facilitate a combined transaction whereby the vendor is availed of all of funds, and both the client bank account and the financial institution funds are disbursed accordingly. Accordingly, the credit risk associated with the transaction by all parties is reduced.

In some embodiments, the financial institution providing the loan then updates its data records to indicate that such a transaction has taken place and that the pre-approval is no longer available for usage. In some further embodiments, the financial institution is configured to receive from the system's data interfaces information associated with the automobile transaction (e.g., VIN, mileage, make, model, trim options, known damage, previous ownership, timestamp, datestamp), and this information may be used to update the records of the financial institution. Where the automobile is being used as collateral for the transaction, the financial institution then automatically generates security interest documentation (e.g., financing statements, general security agreements) based on the provided information for registration at a security interest registrar such that the loan transaction can automatically be both attached and perfected.

The system that links financing pre-approvals to dealers may be configured to further provide technological improvements. For example, one or more data interfaces may include, among others, online banking or a mobile application, and the mobile device of the customers may, for example, be adapted to share information about the pre-approval with one or more specific dealers.

In some embodiments, when approaching or entering a dealership, a mobile application or a device may monitor the user's location and prompt the user to share the pre-approval information with the dealer at that time. The sharing might be anonymized and might only share an identifier for the pre-approval, without any personal information about the customer.

The dealer's computer systems may receive these pre-approval identifiers, for example, in a web portal or mobile application. If the customer elects to enter the dealership and go on a test drive with the dealer, the dealer may bring a mobile device (e.g., phone, tablet) with, for example, the dealer's mobile app. If the pre-approval is already pushed to the dealer's device, it can be viewed, or the customer may choose to manually share the pre-approval information with the dealer through the customer's mobile app at that time.

If the customer chooses to undergo the transaction, the transaction can be completed entirely from within the dealer's mobile device and/or mobile application without even having to return into the dealership. When the dealer attempts to apply the customer's pre-approval to the car purchase, a message may be sent through the system's server(s) to the customer's device or application thereon requesting the customer's approval to apply the automobile loan to the transaction. When accepted, the dealer can transfer ownership of the vehicle to the customer and the sale is complete.

Once the car loan is applied to the vehicle purchase, the customer may receive a notification regarding any loyalty rewards features applied to the car loan, and the requirements for obtaining the rewards.

A challenge with loans is a propensity of customers to pre-pay their loans and/or accelerate their payments. For a lender whose loans are being repaid at an accelerated or unexpected pace, challenges may arise relating to the re-investment of funds (e.g., being forced to reinvest at a lower rate) and an unpredictability of the payback schedule.

In an embodiment, a loyalty rewards system is provided whereby a type of loyalty reward is accrued over the life of the car loan. The loyalty rewards system is adapted to aid in the differentiation of one loan from another, and to encourage customers to not pay back the loan in an accelerated manner, but rather, encourage customers to pay out the loan during the entire duration of the loan term.

Loyalty rewards may be, for example, maximally accrued and/or provisioned wherein the customer pays the loan back over a predefined number of years. The reward may include, for example, loyalty points, a personalized discount offer on a new car at the end of the loan term from the same dealer or manufacturer, among others.

FIG. 1 illustrates a block diagram of a system for provisioning loans according to some embodiments.

In the context of automobile financing, system 100 is adapted for use of parties associated in the automobile industry, including banks, automobile manufacturers, independent third party dealers, dealerships, and any organization that transacts in the purchase or lease of automobiles. The system 100 may include online banking portals, platforms, etc. and receives information in the form of input strings and detected input events from input interfaces.

A third party financial institution 150 may be engaged by customer 130, including individuals and dealer among other parties. Third party financial institution 150 may record data using data storage 158, which may store the data using electronic representations and/or electronic signals. Data representing to a pre-negotiated loan may be entered into backend computing device 154 manually or retrieved from archives through a query directed at data storage 158. Backend computing device 154 may be queried for pre-negotiated loan terms from any source internal to third party financial institution 150 or external source connected to network 170. Loan terms may, in some embodiments, depend on information from the transaction itself, to be updated when the final vehicle information (e.g., as extracted from a unique identifier, such as a VIN) and may be set having various programmatic variables (e.g., 80% of the final purchase price of a vehicle between $20,000-$40, 000 that is a four door vehicle with either an inline-6 engine or a V-6 engine). The pre-negotiated loan terms may include variables such as loan amount, loan rate, amortization period, and/or any associated options (e.g., accelerated payment options, convertibility).

In some embodiments, before any data array, packet, or set is transmitted beyond the exclusive control of third party financial institution 150, it may undergo computational transformations by loan transaction information encryption engine 156. In some embodiments, loan transaction information encryption engine 156 disaggregates the loan information into multiple data arrays, packets, or sets. The loan information may be abstracted or otherwise transformed into an obfuscated version for sharing with a vendor (without providing an overabundance of personal information).

Providing the exact pre-approval information at too early a stage may lead to undesirable information leakage and a loss of negotiating leverage. The loan information is also utilized to generate a variable set of programmatic instructions that are configured for population with the transaction information for transmittal to a clearing house sever. As the transaction specifics are not known at the time of generation of the data packet, the programmatic instructions have embedded instruction sets that, responsive to the transaction information, modify the programmatic instructions accordingly to reflect pre-negotiated loan parameters. For example, there may be time, value, or maker based modifications to loan amounts, rates, amortization periods, options, etc., and these are reflected in the programmatic instructions by way of modification of the programmatic instructions in accordance with logical rules associated with the pre-approval (e.g., reflecting programmed in incentives (e.g., better rate for car model expected to have better re-sale value), disincentives (e.g., worse rate for using the pre-approval later in the pre-approval as the pre-approval may become based on 'stale' information).

In some embodiments, one or more data arrays, packets, or sets in the form of partial or obfuscated pre-approval data arrays, processes, packets, or sets are transmitted though communication system 120 either directly or through network 170 to one party. One or more data arrays, processes, packets, or sets in the form of corresponding and/or complementary pre-approved data sets are transmitted through communication system 120 either directly or through network 170 to at least one other party.

Dealer-facing data receiver 110 may receive data arrays, packets, or sets via the network 170 or communication system 120. Obfuscated pre-approval information decryption engine may receive data arrays, packets, or sets from dealer-facing data receiver 110. At any time, data storage 118 may store any data received, created, or generated in this process, facilitated by pre-approval information management engine 112. The pre-approval information management engine 112 is configured to generate the instruction sets for controlling automated disbursement of funds. In some embodiments, obfuscated pre-approval information engine 116 decrypts obfuscated pre-approval data arrays, packets, or sets.

Customer-facing data receiver 138 may receive one or more data arrays, packets, or sets in the form of corresponding and/or complementary pre-approved data arrays, packets, or sets through customer computing device 134, such as a mobile computing device, tablet computing device, laptop computing device, or desktop computing device. At external database(s) 148 may store any data received, created, or generated in this process.

In some embodiments, complementary pre-approval information decryption engine decrypts complementary pre-approved data arrays, packets, or sets. Loan provisioning engine 122 may provision a loan pursuant to a ping, query, or triggering event from integration engine 124. A ping, query, or triggering event may result from the integration of one or more data arrays, packets, or sets in the form of partial or obfuscated pre-approval data arrays, packets, or sets and one or more one or more data arrays, packets, or sets in the form of corresponding and/or complementary pre-approved data arrays, packets, or sets. Loan provision engine 122 may periodically and/or regularly communicate with third party financial institution 150.

Figure 2:
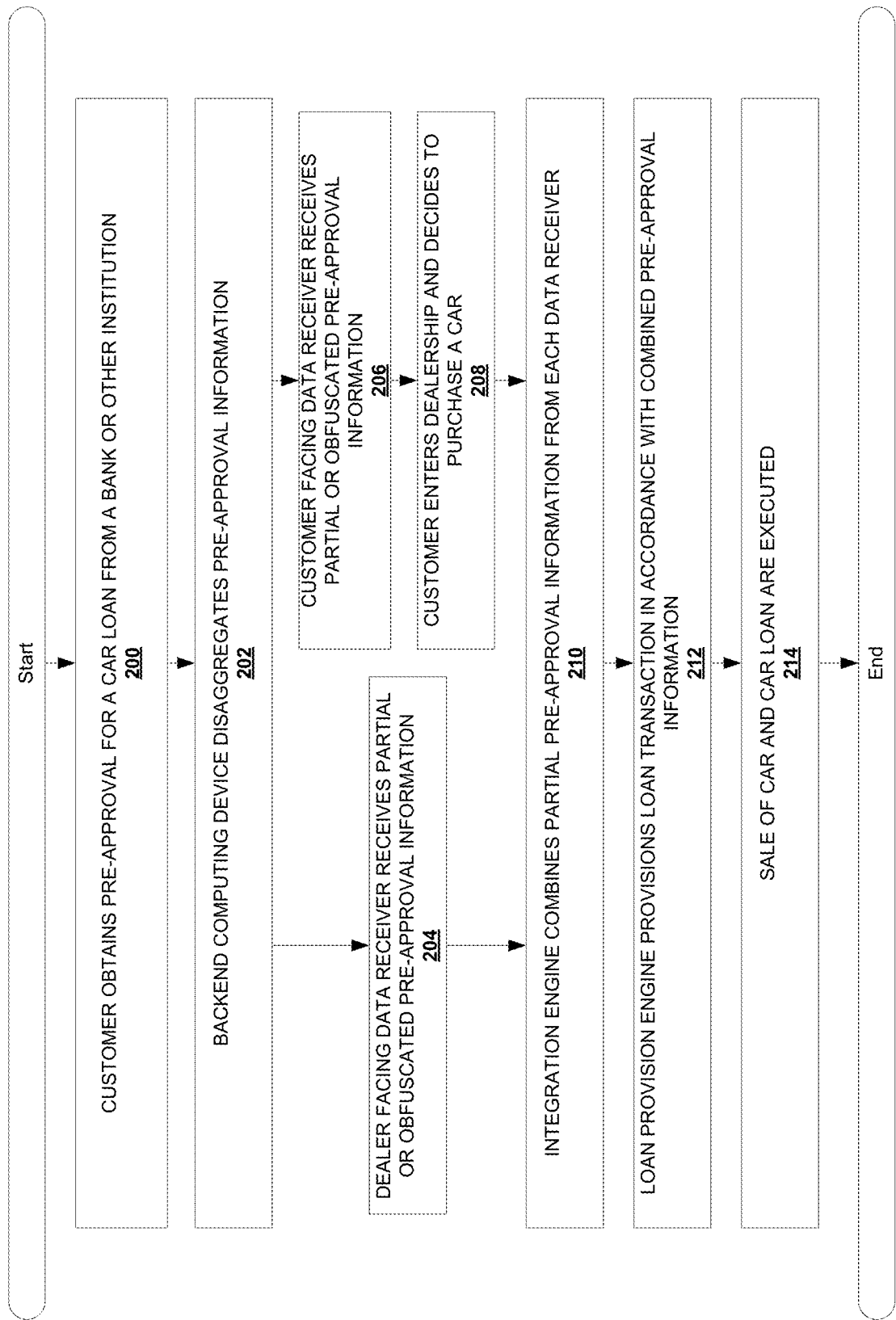
FIG. 2 is a process diagram illustrating an example process for the loan provisioning and associated data, according to some embodiments.

FIG. 2 is a process diagram illustrating an example process associated with the loan provisioning and associated data, according to some embodiments.

Customer 130 may have pre-negotiated a loan term with one or more third party financial institutions 150, as depicted in 200. Where customer 130 has pre-negotiated loan terms with multiple third party financial institutions 150 and/or multiple pre-negotiated loan terms that change as a function of dealership, time, location, among other factors, the terms of the loans may be the same or different.

Backend computing device 154 utilizes loan transaction information encryption engine 156 to disaggregate and/or encrypt the loan information into a least two components which may be segmented and not independently accessible by other parties. In some embodiments, one component is comprised of one or more partial or obfuscated pre-approval data sets and another component is comprised of one or more corresponding and/or complementary pre-approval data sets. In some embodiments, loan transaction information encryption engine 156 is provided in a specialized, dedicated secure processing enclave that is configured for specific computing functions associated with encryption and generation of a data packet only. The secure processing enclave, in some embodiments, is a processor or processing unit that is intentionally separated on a printed circuit board having its own set of dedicated connections, and is capable of only running a narrow set of instructions for a limited function (relative to a general purpose processor).

The secure processing enclave aids in ensuring that the system is less susceptible to fraud, as arbitrary code cannot be executed in the secure processing enclave. Where other computing components are compromised, the secure processing enclave may maintain its integrity by way of its inability to process arbitrary instruction sets. The secure processing enclave may store the protocol parameters, polynomials or other seed information used to generate the key-pairs separately, thus increasing a security level associated with the key-pairs. The secure processing enclave, in some embodiments, incorporates the processor of a key-generation system, which may be a secure processing crypto-processor. In other embodiments, the secure processing enclave includes a separate secure processing crypto-processor that interoperates with another processor.

Dealer-facing data receiver 110 may receive one or more partial or obfuscated pre-approval data sets as depicted in 204. Customer-facing data receiver 138 receives one or more corresponding and/or complementary pre-approval data sets as depicted in 206.

In the context of automobile financing, customer 130 may decide to purchase a car from dealer, as depicted in 208. Integration engine 124 combines and/or decrypts however many components of the original loan information was initially disaggregated into and/or encrypted by loan transaction information encryption engine 156, as is depicted in 210. In some embodiments, the capability of integration engine 124 to combine and/or decrypt is contingent on the location and schedule of customer 130, as determined by customer scheduling and location trackers 132. Loan provision engine 122 may provision a loan in accordance with the combined pre-approval information, as depicted in 212.

In the context of automobile financing, the sale of the automobile and the automobile loan may be executed pursuant to the loan terms, as depicted in 214

Figure 3:
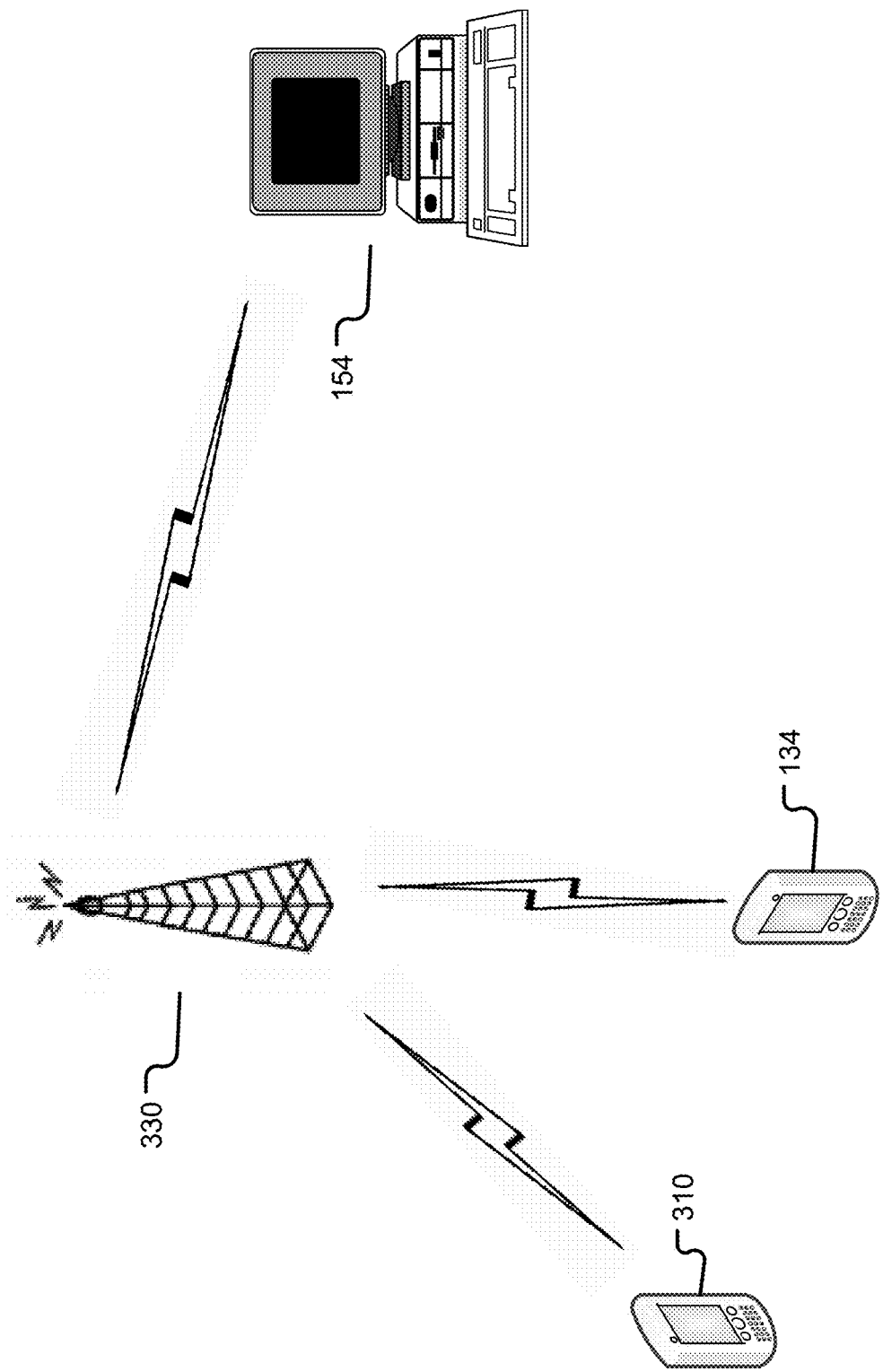
FIG. 3 illustrates a communication system between any number and combination of customer computing devices, dealer computing devices, and backend computing devices.

FIG. 3 illustrates a communication system between customer computing devices 134, dealer computing devices 310, and backend computing devices 154, according to some embodiments. These devices may communicate with each other by communication enabling process 330. Communication enabling process 330 may be a remote network or a local network.

In some embodiments, customer computing device 310 may incorporate any combination of customer-device data receiver 134 and client scheduling and location trackers 132.

In some embodiments, dealer computing device 310 may incorporate any combination of dealer-facing data receiver 110, pre-approval information management engine, obfuscated pre-approval information decryption engine 116, loyalty determination engine 126, integration engine 124, loan provisioning engine 112, and communication system 120.

In some embodiments, backend computing devices 154 may incorporate a third party financial institution 150 and loan transaction information encryption engine 156.

In some embodiments, communication enabling process 300 may include combinations of active and passive communications processes, including by not limited to Bluetooth technology, near field communication, radio communication, serial data communication, parallel data communication, data packet communication, optical communication, photonic communication, sonic communication, radio-frequency identification (RFID), telegraphy, and any other electronic technology whereby devices are mutually connected by any kind of optical, glass, metallic, carbon-based, or other electronic or photonic signal carrying wire or connection.

In some embodiments, dealer computing devices 310, computer devices 310, and backend computing devices 154 may communicate through network interface 508.

Figure 4:
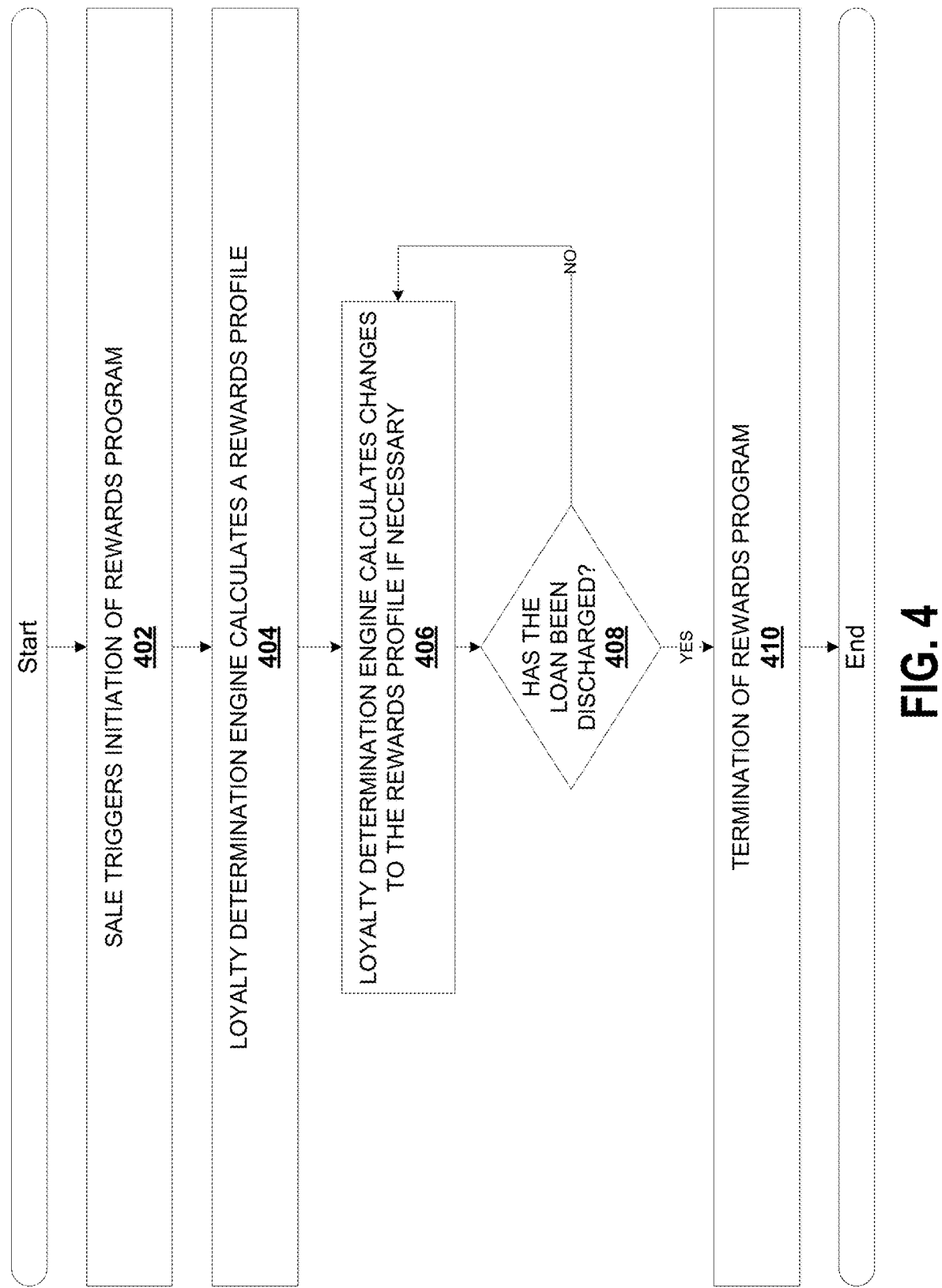
FIG. 4 is a sample workflow of a reward program, according to some embodiments.

FIG. 4 is a sample workflow of a reward program, according to some embodiments.

In some embodiments, upon the completion of a sale transaction, loyalty determination engine 126 is queried by any combination of customer computing devices 134, dealer computing devices 310, and backend computing devices 154 via network 170. This query triggers the initiation of a rewards program for customer 130 as depicted in 402.

In some embodiments, loyalty determination engine 126 generates a customer rewards profile based on the terms of the loan, the particulars of the sale of the vehicle, and other considerations, as depicted in 404.

In some embodiments, loyalty determination engine 126 may a recalculate the customer rewards profile upon a change in status of any combination of the considerations initially accounted for by loyalty determination engine 126. For example, the loyalty rewards system may be initially configured to deliver a maximum amount of rewards units conditional on customer 130 abiding by certain loan terms. In this example, if customer 130 deviates from the terms, perhaps by paying back the loan ahead of schedule, the amount of rewards units that customer 130 is entitled to is recalculated by loyalty determination engine 126.

A decision process is depicted in 408. In some embodiments, loyalty determination engine 126 periodically queries third party financial institution 150 for the status of the loan among other considerations taken into account by in determining the loyalty rewards profile. The result of the query may trigger a recalculation of the loyalty rewards profile attributable to customer 130.

In some embodiments, queries to loyalty determination engine 126 continue periodically until the loan has been discharged, as depicted in 408.

The discharge of the loan may trigger the termination of the rewards program, as depicted in 410.

Figure 5:
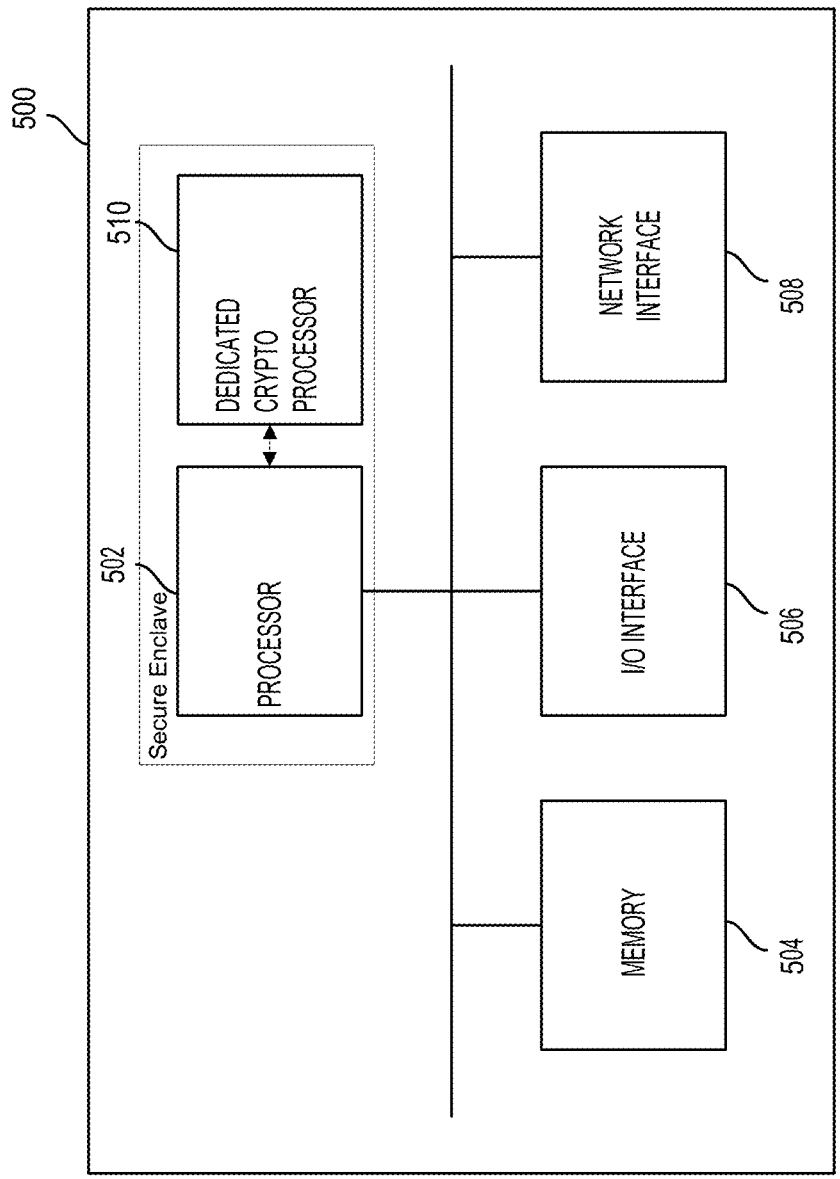
FIG. 5 illustrates a schematic of a loan provisioning device according to some embodiments.

FIG. 5 illustrates a schematic of a loan provisioning device 500 according to some embodiments.

As depicted, loan provisioning device 500 may include a processor 502, memory 504, at least one I/O interface 506, and at least one network interface 506.

Processor 502 may be, for example, a microprocessor or microcontroller, a digital signal processing (DSP) processor, an integrated circuit, a field programmable gate array (FPGA), a reconfigurable processor, a programmable read-only memory (PROM), or combinations thereof.

Memory 504 may include a suitable combination of computer memory that is located either internally or externally such as, for example, random-access memory (RAM), read-only memory (ROM), compact disc read-only memory (CDROM), electro-optical memory, magneto-optical memory, Ferroelectric RAM (FRAM) or the like.

In some embodiments, memory 504 may be accessible through network interface 508. In some embodiments, memory 504 may be delocalized across any number of servers accessible through use of network interface 508.

Each I/O interface enables loan provisioning device 500 to interconnect with one or more input devices, such as a keyboard, mouse, camera, touch screen and a microphone, or with one or more output devices such as a display screen and a speaker.

Each network interface 508 enables loan provisioning device 500 to communicate with other components, to exchange data with other components, to access and connect to network resources, to serve applications, and perform other computing applications by connecting to a network.

Loan provisioning device 500 may be comprised of a combination of any type of mobile devices, laptop devices, and desktop devices.

In some embodiments, loan provisioning device 500 may require proximity to any other type of mobile device, laptop device, desktop device, receiver, transceiver, active or passive RFID device in order to access any network through network interface 508.

In some embodiments, loan provisioning device 500 may require proximity to a particular geography, such as an automobile dealership, in order to access any network through network interface 508.

Memory 504 may track and store user generated data. User generated data may be generated actively or passively. For example, the user may actively input personal information. Additionally, the GPS data may be passively tracked and stored.

In some embodiments, privacy protection protocol or software may be incorporated into loan provisioning device 500 in order prevent the tracking and storing of sensitive user generated data.

FIG. 6 is a data structure diagram illustrating a sample data structure, according to some embodiments. The data structure includes first portion 602, second portion 604, third portion 606, and header information 608 (e.g., the data structure, for example, is a tripartite data structure, each portion having different characteristics that provide specific layers of protection for its underlying information, the protection including at least data encryption to reduce the likelihood of unauthorized access by unauthorized parties.

While public/private key pairs and one-time use keys are described in various embodiments below, in some embodiments, the keys are a first key and a corresponding second key. The first key and the corresponding second key can be different and configured to complement one another (e.g., public/private key pairs), or in other embodiments, could be the same key (e.g., a symmetric key). Symmetric keys have technical advantages where a large amount of information is being encrypted (e.g., speedier encryption speed), and asymmetric keys have technical advantages in relation to increased security and one-way encryption (e.g., an unauthorized individual obtaining access to the public key is still unable to decrypt the data structure).

The data structure is propagated to a vendor/point of sale device, and is stored there for decryption and access by way of corresponding private keys that are utilized to unlock the different portions. In some embodiments, a superset of current data structures representing current leads are propagated in bulk to one or more vendors (e.g., by bulk push, download) on a periodic basis, such that vendors are kept current in relation to potential leads. However, without the corresponding private keys (e.g., client key and financial institution key), portions of the data structures, while already residing on vendor systems are not accessible by the vendor.

In some embodiments, the vendor/point of sale device generates and/or maintains both a vendor/point of sale public key and a vendor/point of sale private key. In this example, the vendor/point of sale computing device transmits the vendor/point of sale public key to the financial institution computing device so that the financial institution computing device can generate the data structure and encrypt data stored in the tripartite portions accordingly.

In another embodiment, the financial institution computing device is configured to generate the vendor/point of sale public/private key pair, and transmits only the vendor/point of sale private key to the vendor/point of sale device so that it is able to decode/decrypt portions of the data structure as required. A benefit of this embodiment is increased simplicity for the vendor/point of sale, especially where the vendor/point of sale utilizes fairly obsolete/old technology. A technical benefit is provided as the vendor/point of sale only receives the vendor/point of sale private key and does not have to generate a key pair. One-time use key pairs offer an increased level of security as a unique keypair is generated and used only once and discarded. Increased security is of prominent importance in relation to authorization of financial transfers (e.g., the third portion).

The data structure is encapsulated at the time of generation by a financial institution computing backend when a pre-approval is obtained by the client. The data structure may include additional data sets representative of data characteristics and redemption characteristics, such as preconditions, variables that impact aspects such as interest rate (interest rate of 2.0% if transaction consummated within 2 weeks, 2.5% otherwise), among others. The data structure includes data sets that maintain (1) client information, (2) pre-approval information, and (3) transaction initiating/settling information.

First portion 602 includes a data payload storing high level information that includes intentionally obfuscated details relating to the transaction, such as a client ID, a range of pre-approval (e.g., without releasing the specific pre-approval details), an indication of credit level, an indication that the individual is employed, etc. The first portion 602 is encrypted by way of a public vendor key so that the vendor's systems are able to process the first portion by decrypting it with a corresponding private key. The lead information may include a lead/masked ID. The corresponding lead/masked ID is provided to the customer for ease of identification. The first portion 602 may include other information, such as a general range of approval, and ranges of approved vehicles and trim packages.

From a technical perspective, obfuscation versions are generated by way of a mask being applied to the pre-approval details. The mask can include bit masks, applied by a masking engine that transforms the pre-approval details first into a bitwise representation (for a second portion of the data structure), and applies the mask to generate a partially masked version for the first portion of the data structure.

In some embodiments, the mask is reversible, and the second portion includes information that is applied to reverse the mask. In this example, the mask is a bitwise transformation, and the second portion stores details of the inverse bitwise transformation, the inverse bitwise transformation being applied to the first portion to obtain the underlying loan information. Storing simply the inverse bitwise transformation reduces the memory required to store the data structure. Bitwise transformations include bit-shifts, various combination of bitwise operators such as AND, OR, XOR, NOT, etc. Bitwise transformations are particularly well suited for reduction of processing time required as they, in some embodiments, are performed using high speed FPGAs or shift registers (e.g., a cascade of memory flip-flops). Parallel-in memory registers can be used to conduct shifts efficiently.

Second portion 604 includes a data payload storing additional information relating to the pre-approval, such as the client's name, address, interest rate for the pre-approval, more exact pre-approval ranges, etc. The second portion 604 includes client information that can be utilized in negotiating for a vehicle under the auspices of the pre-approval. For example, more detailed information relating to the pre-approval's parameters may help the vendor and/or the client decide which vehicle is best for the client based on economic factors noted in the pre-approval, as well as the expected periodic payments. Incentives may be included in the second portion 604, which, for example, may provide reduced rates for particular types of transactions or automobiles (e.g., automobiles having a higher expected residual value).

The second portion 604, with the correct client private key (e.g., provided automatically by the client's computing device upon a detection that the client is at the dealership) allows full information to be obtained for the transaction. Other approval types are possible, such as Internet based approval or mobile app-based approval, where the client private key is authorized to be provided to the vendor. The dealer is now able to access more useful information relating to the pre-approval, and may compare with inventory, etc., and make one or more offers. When the deal is near consummation and agreed upon, the client, through client's computing device may submit an indication to the financial institution, which upon approval, may send a financial institution private key to the vendor computing system, the combination of which with the vendor private key, and the client private key allows the unlocking of a third portion 606.

Third portion 606 includes a data payload that stores financing settlement information, which are transmitted to a payment processor or settlement house for disbursement of funds from a holding account to an account as directed by the vendor. The third portion may include highly sensitive information, such as bank account numbers, wire transfer information, passwords/pass keys/pass codes utilized for automatically initiating transfers, protocol information, etc. The third portion may be further secured using a combination of three keys, the public client key, the public vendor key, and a one-time use financial institution public key. The third portion 606 is configured for decryption only through a combination of the three private keys corresponding to the keys utilized to encrypt the third portion.

The third portion 606 includes, in some embodiments, protocol information that includes the application programming interface (API) syntax for passing parameters and/or other authentication information for payment processing. For example, the parameters may include target bank account number/information, a VIN number of the vehicle, etc. The processing of the third portion may cause the disbursement of the funds, as well as the generation of a security interest against the automobile as collateral.

The third portion 606 may further include reward earning information, which may, in some cases, be tied to the provisioning of the loan as rewards points/virtual currency is rewarded based on aspects of the loan transaction as it is paid off over time (e.g., points for keeping loan without pre-payment, points for paying interest payments on time).

In a further embodiment, the third portion 606 includes automatic authorization instructions for automatically causing the transferral of funds from a bank account associated with the client as well. In this embodiment, the third portion 606, when transmitted to a clearing house device or other type of settlement mechanism, automatically conducts the entirety of the funds transfer from both the financial institution lending the money and the client's bank account, to the designated vendor/point of sale bank account. Accordingly, the third portion 606, when transmitted and accepted/approved at the clearing house device/settlement mechanism, enables the electronic consummation of the entirety of the financial transaction without requiring further inputs from the client, the vendor/point of sale, or the financial institution.

As an example use case, a client, during a test drive, decides that the client wishes to complete the transaction. The client, on the client's mobile device, then selects a visual interface element indicating that the transaction is confirmed. The client's mobile device independently transfers the authorization to the financial institution computing device. The vendor representative, using a device coupled to the vendor/point of sale device, authorizes the transaction by selecting a visual interface element. The vendor/point of sale device then also transfers the authorization to the financial institution computing device.

The financial institution computing device then transfers the one-time use financial institution private key to the vendor/point of sale device, which then uses all three of the private keys to unlock the third portion 606, configures and generates an instruction set representative of settlement information based on the syntactical transfer information stored thereon, and sends the configured settlement information instruction set, as derived from third portion 606, to the clearing house device/settlement mechanism, initiating the funds transfer.

The funds transfer automatically withdraws money from both the client's bank account (e.g., via a pre-approved debit transaction), the financial institution's loan account. The funds transfers provides the monies (e.g., via a SWIFT transaction or electronic wire) into an account designated by the vendor/point of sale. The funds transfer takes place, and the transaction is consummated. The client is able to take ownership of the car with the retailer being fully paid up.

Header information 608 includes data sets describing the type of data structure, the key requirements, and may contain addressing or other data required for transmission to a destination.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A point of sale computing device configured for facilitating a loan allocation transaction including an automobile financing transaction over at least two transaction phases, the loan allocation transaction based on a multi-layer cryptographically secure data structure, the point of sale computing device including:
    at least one processor configured to:
        maintain a corresponding vendor second key in a secure data storage, the vendor second key corresponding to a vendor first key;
        receive, and store in the secure data storage, the multi-layer cryptographically secure data structure having at least two portions including:
            a first portion encapsulating a first data payload representative of unmasked pre-approval data and masked pre-approval data, the first data payload encrypted using at least with the vendor first key; and
            a second portion encapsulating a second data payload including inverse transformation data for un-obfuscating the masked pre-approval data, the second data payload encrypted at least with a first combination of a client first key and the vendor first key, the client first key being reversible with a corresponding client second key;
        decrypt, during a first transaction phase, the first portion based on the corresponding vendor second key to access the unmasked pre-approval data, wherein the masked pre-approval data represents obfuscated data in the absence of a decrypted second portion;
        communicate during the first transaction phase the unmasked pre-approval data of the first portion at a user interface;
        decrypt, during a second transaction phase, the second portion using a combination of the client second key and the vendor second key to access the inverse transformation data;
        unmasking the masked pre-approval data upon decrypting the second portion by combining the inverse transformation data and the masked pre-approval data; and
        communicate a set of loan allocation transaction options based on unencrypted and unmasked pre-approval data accessible upon decrypting the first portion and the second portion during the respective first transaction phase and the second transaction phase,
    wherein the data structure is a tripartite data structure including the first portion, the second portion, and a third portion;
    wherein the at least one processor includes a dedicated secure crypto-processor configured to decrypt the data structure independently of the corresponding computing devices associated with the client, the point of sale, and the financial institution such that none of the corresponding computing devices associated with the client, the point of sale, and the financial institution are able to access the data structure during decryption, and the secure data storage interconnects only with the dedicated secure crypto-processor; and
    wherein the dedicated secure crypto-processor is housed in a secure enclave in a computer motherboard.

2. The point of sale computing device of claim 1, wherein the data structure includes:
    a third portion encapsulating a third data payload storing third data sets representative of automated transaction processing instruction sets, the third data payload encrypted at least with a second combination of the client first key, the vendor first key, and a financial institution one-time use first key, the financial institution one-time use first key being reversible with a financial institution one-time use second key; and
    the at least one processor is configured to:
        receive an identifier representing a selected loan allocation transaction option of the set of loan allocation transaction options for transaction processing;
        receive a second data message from a second computing device associated with a financial institution providing loan allocation, the second data message including at least the financial institution one-time use second key;
        decrypt the third portion using the corresponding vendor second key, the client second key, and the one-time use second key to access the third data payload, the third portion providing a variable set of programmatic instructions and a secure authorization passcode;
        responsive to the selected loan allocation transaction option, transforming the set of programmatic instructions in accordance with parameters of the selected loan allocation transaction option into configured automated transaction processing instruction sets; and
        transmit the set of programmatic instructions to an automated clearing and settlement system, the set of programmatic instructions including at least transaction parameters and the secure authorization passcode to authorize an electronic release of funds corresponding to the transaction parameters.

3. The point of sale computing device of claim 1, wherein a first data message is received from the first computing device upon detection of the first computing device entering a physical proximity of the point of sale computing device, wherein the first data message includes at least the client second key corresponding to the client first key.

4. The point of sale computing device of claim 2, wherein the transaction parameters includes at least one of a unique vehicle identification number string, a transaction price integer; and wherein the automated clearing and settlement system are configured to receive the transformed third data sets to automatically determine at least a loan amount and a loan interest rate, the loan amount being disbursed from a financial institution bank account to a target recipient bank account, and the loan amount being automatically registered as a loan against a client bank account in accordance with an electronically registered security interest designating a vehicle identified by the unique vehicle identification number string as collateral.

5. The point of sale computing device of claim 4, wherein the at least one processor is configured to generate and transmit a security interest data set to a security registry computing system.

6. The point of sale computing device of claim 2, wherein the third data sets include syntactical protocol descriptors, which are utilized for transforming the third data sets in accordance with the electronic parameters.

7. The point of sale computing device of claim 2, wherein the third data sets include syntactical protocol descriptors, which are utilized for transforming the third data sets in accordance with the electronic parameters.

8. The point of sale computing device of claim 2, wherein the third data sets include rewards eligibility parameters;
    upon a determination that the transaction parameters satisfy the rewards eligibility parameters, the set of programmatic instructions includes updating one or more rewards profiles associated with the client or the vendor to enable provisioning of one or more rewards to the client or the vendor.

9. The point of sale computing device of claim 8, wherein the one or more rewards are provisioned periodically across the loan duration upon satisfaction of one or more milestone requirements; and the one or more milestone requirements are tracked against a lifespan of the automobile financing transaction, and the one or more milestone requirements include at least a detected adherence to a payment schedule at each milestone requirement free of accelerated payments.

\* \* \* \* \*